Nov. 4, 1952

W. L. L. VIVIE

SYSTEM FOR THE REPRODUCTION OF PHONOGRAPH RECORDS OF DIFFERENT DIAMETERS

Filed July 8, 1946

2,616,708

INVENTOR
WILHELMUS LAMBERTUS LEONARDUS VIVIE
BY [signature]
ATTORNEY

Patented Nov. 4, 1952 2,616,708

UNITED STATES PATENT OFFICE 2,616,708

SYSTEM FOR THE REPRODUCTION OF PHONOGRAPH RECORDS OF DIFFERENT DIAMETERS

Wilhelmus Lambertus Leonardus Vivie, Eindhoven, Netherlands, assignor to Hartford National Bank and Trust Company, Hartford, Conn., as trustee Application July 8, 1946, Serial No. 681,813
In the Netherlands January 27, 1943

Section 1, Public Law 690, August 8, 1946
Patent expires January 27, 1963

4 Claims. (Cl. 274—15)

Figure 1:
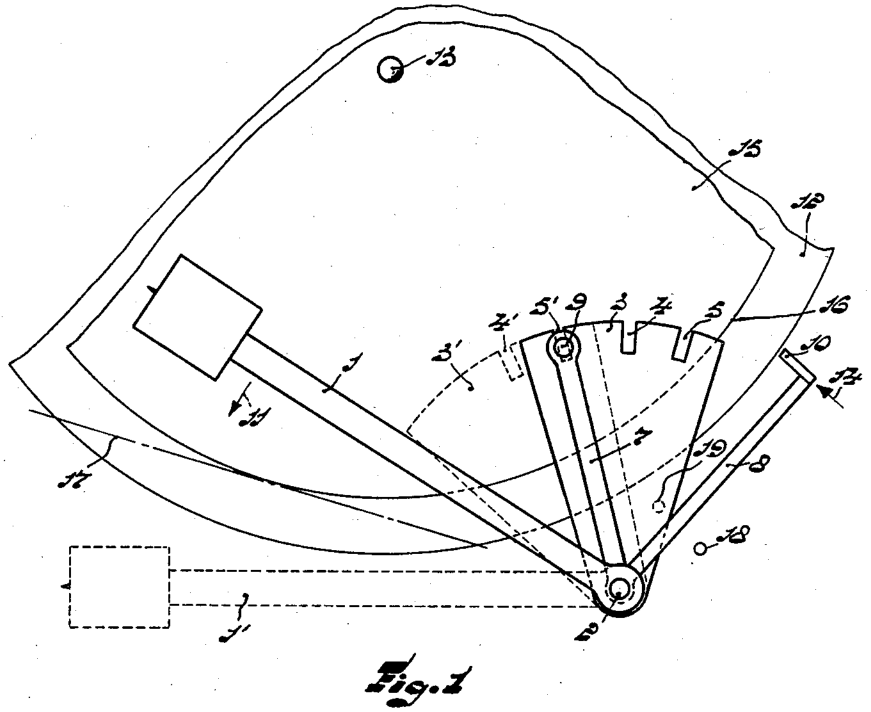

This invention relates to a system for the reproduction of phonograph records having different diameters, in which the stylus of the sound box for the reproduction is automatically placed at the start of the grooves of the record. The device by means of which this is effected is to be controlled in accordance with the diameter of the record in such a manner that the correct positioning of the stylus on the phonograph record of large or small diameter is always ensured. Reckoned from a fixed starting position, the automatically actuated sound box carrier, in the case of a large record, need be swung inwards less far than in the case of a plate of smaller diameter. Since there are substantially only two kinds of plates viz. of 250 mms. and 300 mms. in diameter it is practically sufficient to design the automatic system only for two positions for setting the stylus.

According to the invention a simple, reliable and accurate principle of determining the correct position, which the stylus of the sound box is automatically given the beginning of the record, consists in that the sound box is connected, through a slip coupling, to a member for scanning the record diameter, the slip connection becoming operative after scanning the record diameter during one of the automatically controlled movements of the sound box and the position of the scanning member then fixed determining the position where the sound box is placed upon the plate.

The scanning may take place, since as a result of the slip connection the scanning member follows the movements executed by the sound box according to a definite scheme (the placing upon the record from the start, the playing of the record which involves a slow movement in a radial direction, the return to the initial position) as long as resistance is nowhere experienced. If, however, the scanning member abuts against the outer edge of a record during one of these movements, which record is automatically supplied to be played next, the member reaches the aforesaid fixed position, which is a measure of the automatic control by means of which the sound box is removed, in accordance with a diameter of the record, from a definite position, generally the starting position, to the desired point of the phonograph record meanwhile placed upon the turn table. The way in which the automatic control device can be acted upon by the said position of the scanning member will be more fully explained in the description of the drawing.

According to the invention the sound box and the scanning member preferably cooperate in such a manner that the scanning of the record diameter takes place during the return stroke and the sound box is coupled, through the slip connection to the scanning member at least during part of this movement. The expression "return stroke" is to be understood to mean the distance to be travelled by the sound box after playing a record to resume its initial position.

The reason why the scanning of the record diameter according to the invention preferably takes place during the return stroke of the sound box is that the force with which the sound box is urged to resume the initial starting position during this stroke, is sufficient to surmount the friction during the sliding friction of the slip connection, since this force is derived from the driving motor of the automatic system. If, on the other hand, the scanning of the record diameter should take place during the forward stroke in playing the record, the frictional force evolved during operation of the slip connection would have to be taken up by the track conveying the stylus of the sound box and urging it radially to the center of the record, which might be objectionable both in regard to the groove and in regard to the suspension system of the stylus. However, the same drawback may occur during the return stroke with the method used according to the invention of scanning the record diameter. In fact, when the record diameter has been scanned and the sound box has been placed at the desired point at the start of the record in accordance with the position of the scanning member, the angle between the sound box carrier and the arm to which the scanning member is secured, which angle is fixed by means of the slip connection, must be decreased. Indeed, if the record last scanned in regard to its diameter would have a large diameter and the angle between the two said arms would not be reduced, the diameter of a next record of small diameter cannot be scanned during the return stroke, since the unchanged angle between the two arms adjusted for a plate of large diameter only just permits the edge of a record of large diameter to be reached.

Consequently, the angle between the two said arms obtained upon scanning a record in regard to its diameter must be reduced. As a rule this should take place in playing a record, for instance by arresting the arm of the scanning member by means of a stop. Also in this case the friction then ensuring in the slip connection would consequently have to be taken up by the groove and the suspension means of the stylus with all consequent drawbacks.

This is why it is advisable that the coupling between the two aforesaid arms should entirely or almost entirely be removed in playing the record, as a result of which the desired angle variation can practically take place without friction. Consequently the sound box need be coupled to the scanning member, through the slip connection, only during this part of the return stroke, when the actual scanning of the record diameter takes place.

This may take place in various ways. Thus, for instance, the coupling and decoupling of the sound box may take place during the lifting and lowering of the sound box into the last and first groove of the record respectively. On moving the sound box from the outer position to the start groove of the record to be played the scanning member is then passed back into its starting position and is ready for service again.

Figure 2:
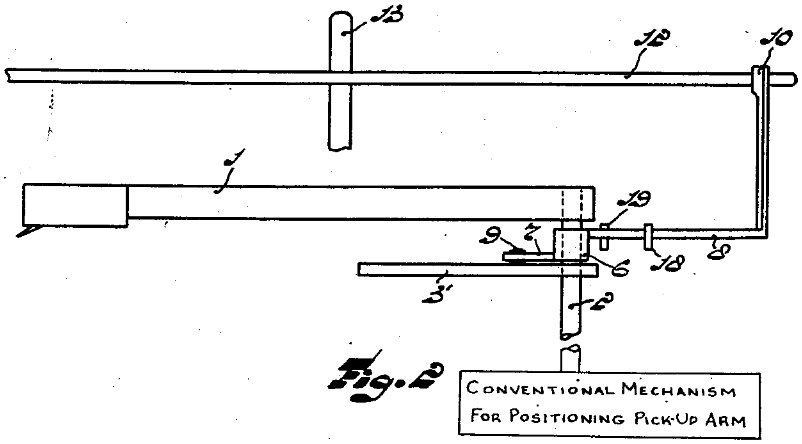

In order that the invention may be clearly understood and readily carried into effect it will now be described more fully with reference to the accompanying drawing, given by way of example, in which Figures 1 and 2 are a plan and a side elevation respectively.

The arm 1 of a sound box is rigidly connected by means of a shaft 2 to a coupling plate 3 constituting a circle sector (3′ in the position shown in dotted lines) which plate may, for instance, be provided with two recesses 4 and 5. On the shaft 2 is pivotally seated a bushing 6 having two arms 7 and 8 of which the former engages the coupling plate 3 elastically by means of a metal ball 9, thus forming a slip connection, whereas the latter ends in the scanning member 10 for the record diameter. The friction between the ball 9 and the coupling plate 3 is such that the bushing 6 and the two arms 7 and 8 follow the movements of the arm 1 as long as the member 10 does not experience any resistance. When a record has been played by the sound box the arm 1 moves in the direction of the arrow 11 during the return stroke in a well known manner as by means of conventional arm actuating means shown in the drawing only diagrammatically, since the particular structure thereof forms no part of the present invention. Such conventional arm actuating means may be of the type as shown, only by way of example, in the U. S. Patent No. 2,043,789 to A. C. Ansley for "Multiple Record Phonograph" and the U. S. Patent No. 2,311,596 to J. H. Pressley for "Automatic Record Changing Apparatus." An automatic device, which does not form part of the invention and is not represented for simplicity, has meanwhile supplied, for instance, a record 12 of large diameter which temporarily occupies the position on the central record spindle 13 shown in Figure 2. When the arm 1 moves in the direction of the arrow 11, the scanning member 10, which moves in the direction of the arrow 14, abuts against the edge of the record 12, so that the bushing 6 having arms 7 and 8 comes to a standstill. The arm 1, however, is further moved on by the conventional mechanism of the automatic phonograph apparatus referred to above in the direction of the arrow 11 until reaching the starting position 1′ of the arm, during which movement the coupling plate 3 slips under the ball, the recess 4 is passed and the ball finally snaps into the recess 5. In this case the arm 1 and the coupling plate 3 occupy the positions 1′ and 3′ respectively (shown in dotted lines), and the ball is at 5′. The phonograph according to the present invention is provided with a conventional over-drive means which is not shown in the drawing as it forms no part of the present invention but may be of the type as shown, only by way of example, in the U. S. Patent No. 2,452,721 to Booher, for "Automatic Record Changing Apparatus." This over-drive functions to prevent the slip coupling including ball 9 from disengaging from either recess 4 or 5 when the arm 1 of the sound box is moved in certain predetermined lateral directions.

When supplying on the other hand, a record 15 of small diameter the scanning member 10, during the continuous movement of the arm 1 to the starting position 1′ in the direction of the arrow 11, moves further in the direction of the arrow 14 than in the case of a record 12 having a large diameter and more particularly up to the point 16 where it attains the edge of the small record 15. At this moment the arm 1 occupies the position 17 shown in dotted lines. Upon a further movement of the arm 1 to the initial position 1′ in the direction of the arrow 11 the plate 3 slips under the ball 9, until the recess 4′ is reached in the position 1′ of the arm. Consequently, the position of the arm 7 with the ball 9 is now different, relatively to the sector-shaped plate 3 and the arm 1, from that in the first-mentioned case in scanning a record 12 of large diameter.

These two different positions serve as a measure for the automatic control of the arm 1. After the records 12 and 15 respectively, upon reaching the position 1′ of the arm 1, have been placed upon the turn table the sound box is placed exactly at the desired point of the record just scanned in regard to diameter, in accordance with the position of the arm 7 and the ball 9.

It will be obvious that this control may take place in various ways. Thus, for instance, the recesses 4 and 5 may be replaced by contact points by which the automatic control is acted upon differently. As an alternative the bushing 6 and consequently the arm 1, in the illustrated position of the arm 7, may be driven from a special driving mechanism through an angular displacement other than when the arm 7 occupies a position corresponding to the recess 4′. Figures 1 and 2 illustrate another possibility, viz. by means of a stop 18, by which the forward stroke of the arm 1′ on setting the sound box (consequently in a direction opposite to the arrow 11) is interrupted mechanically or electrically. Indeed, it appears from Figure 1 that the stop 18 is earlier reached in the position 10 of the scanning member than when this member is at the edge 16.

Finally, another possibility consists in a stop 19 which, if only two different record diameters need be scanned, is capable of taking over the function of the recess 4, so that this is superfluous. The stop 19 is not bound to the location shown in the drawing but may be nearer to the arm 8. In fact, a position should be obtained which is different from the illustrated position of the arm 8 and the scanner 10.

The device according to the invention is not limited to the scanning of only two different diameters, since it is possible without other means to scan more than two diameters, if required, by making use, for instance, of more than two recesses 4 and 5 or corresponding contact points. When it is desired to scan a very large number of different diameters it is advisable that no recesses should be used at all since these require comparatively much space and consequently reduce the number of possibilities.

What I claim is:

1. In an automatic phonograph for playing records of different diameters, a record spindle, a sound box, means pivotally mounting said sound box on a shaft for movement in either direction toward and away from said spindle, means for automatically controlling movement of said sound box in said two directions, means for variably controlling the limit of movement of said sound box in one direction comprising a scanner member, means pivotally mounting said scanner member on said shaft for movement toward and away from said spindle whereby the diameter of a record on said spindle may be scanned, and slip coupling means between said sound box and said scanner member to connect said scanner to said sound box to move said scanner toward said spindle as said sound box is moved away from said spindle, and means responsive to the various fixed positions of said scanner member in said slip coupling means for selectively actuating said variably controlling means.

2. In an automatic phonograph for playing records of different diameters, a record spindle, a sound box, means pivotally mounting said sound box for movement toward and away from said spindle, a scanner member, means pivotally mounting said scanner member for movement toward and away from said spindle whereby the diameter of a record on said spindle may be scanned, and slip coupling means between said sound box and said scanner member, said slip coupling means comprising a pair of coacting members, said coacting members being a plate member having a plurality of recesses at one end thereof and a member having means for selectively engaging in one of said recesses, one of said coacting members being fixedly attached to said sound box for pivotal movement therewith, and the other of said members being fixedly attached to said scanner element for pivotal movement therewith.

3. In an automatic phonograph for playing records of different diameters, a record spindle, a sound box, means pivotally mounting said sound box on a shaft for movement in either direction toward and away from said spindle, means for automatically controlling movement of said sound box in two directions, a scanner member, means pivotally mounting said scanner member on said shaft for movement toward and away from said spindle, means for actuating said scanner member to scan the next record to be played during the return stroke of said sound box, said latter means comprising means for clutching said sound box and said scanner member during the return stroke of said sound box, and means acting on said scanner member for de-clutching said sound box and said scanner member.

4. In an automatic phonograph for playing records of different diameters, a record spindle, a sound box, means pivotally mounting said sound box on a shaft for movement in either direction toward and away from said spindle, means for automatically controlling movement of said sound box in two directions, a scanner member, means pivotally mounting said scanner member on said shaft for movement toward and away from said spindle whereby the diameter of the next record to be played on said spindle may be scanned, slip-coupling means comprising a plate member having a plurality of recesses mounted on said shaft in a fixed relation to said sound box, and selectively engageable in said recesses by an arm mounted on said shaft and fixedly connected to said scanner member in a predetermined position, said coupling means clutching said sound box and said scanner member during the return stroke of said sound box, and means acting on the scanner member for de-clutching said sound box and said scanner member.

WILHELMUS LAMBERTUS
LEONARDUS VIVIE.

REFERENCES CITED

The following references are of record in the file of this patent:

UNITED STATES PATENTS

| Number | Name | Date |
|---|---|---|
| 2,043,789 | Ansley | June 9, 1936 |
| 2,192,360 | Mann | Mar. 5, 1940 |
| 2,263,643 | Offen | Nov. 25, 1941 |
| 2,309,352 | Offen | Jan. 26, 1943 |
| 2,311,596 | Pressley | Feb. 16, 1943 |